United States Patent
Aharoni et al.

(10) Patent No.: US 12,417,113 B2
(45) Date of Patent: Sep. 16, 2025

(54) CONFIGURING STORAGE RESOURCES BASED ON SERVICE LEVELS

(71) Applicant: Dell Products L.P., Round Rock, TX (US)

(72) Inventors: Dan Aharoni, Brookline, MA (US); Arieh Don, Newton, MA (US); Drew P. Tonnesen, Bedford, NH (US)

(73) Assignee: Dell Products L.P., Round Rock, TX (US)

( * ) Notice: Subject to any disclaimer, the term of this patent is extended or adjusted under 35 U.S.C. 154(b) by 584 days.

(21) Appl. No.: 17/720,474

(22) Filed: Apr. 14, 2022

(65) Prior Publication Data
US 2023/0333871 A1    Oct. 19, 2023

(51) Int. Cl.
*G06F 9/455*    (2018.01)
*G06F 9/50*    (2006.01)

(52) U.S. Cl.
CPC ........ *G06F 9/45558* (2013.01); *G06F 9/5016* (2013.01); *G06F 2009/45579* (2013.01); *G06F 2209/501* (2013.01)

(58) Field of Classification Search
None
See application file for complete search history.

(56) References Cited

U.S. PATENT DOCUMENTS

| 10,963,165 B2* | 3/2021 | Sahin | G06F 3/0631 |
| 2014/0380303 A1* | 12/2014 | Bello | G06F 9/45558 |
| | | | 718/1 |
| 2017/0206107 A1* | 7/2017 | Guha | G06F 3/0647 |

OTHER PUBLICATIONS

Performance Implications of Storage I/O Control-Enabled SSD Datastores, VMWare, Inc., available at: https://www.vmware.com/content/dam/digitalmarketing/vmware/en/pdf/techpaper/performance/sioc-ssd-vsphere65-perf.pdf, Mar. 2017.

* cited by examiner

*Primary Examiner* — Bing Zhao
(74) *Attorney, Agent, or Firm* — Ryan, Mason & Lewis, LLP (57) ABSTRACT

Methods, apparatus, and processor-readable storage media for implementing host-controlled service levels are provided herein. An example computer-implemented method includes obtaining, at a storage node of a storage system, information comprising one or more identifiers and one or more service levels that are assigned to virtual machines identified by the one or more identifiers; extracting one of the one or more identifiers from an input-output operation received at the storage node; identifying, based on the extracted identifier, the service level that is assigned to the virtual machine that initiated the input-output operation; and controlling storage resources allocated for one or more additional input-output operations from one or more of the virtual machines based at least in part on the identified service level.

20 Claims, 6 Drawing Sheets

CONFIGURING STORAGE RESOURCES BASED ON SERVICE LEVELS

FIELD

The field relates generally to information processing systems, and more particularly to storage in such systems.

BACKGROUND

Information processing systems increasingly utilize reconfigurable virtual resources to meet changing user needs in an efficient, flexible and cost-effective manner. As an example, a hypervisor can create and allocate resources (e.g., compute, storage, memory, and/or networking resources) of a physical host to one or more virtual machines (VMs). In some systems, the amount of storage resources that is allocated to each VM can be controlled. For example, when a datastore becomes congested, storage resources associated with the datastore can be controlled according to input-output (IO) thresholds (or shares) assigned to each of the VMs. However, such control is generally not available when different VMs use different datastores, for example.

SUMMARY

Illustrative embodiments of the disclosure provide techniques for implementing host-controlled service levels. An exemplary computer-implemented method includes obtaining, at a storage node of a storage system, information comprising one or more identifiers and one or more service levels that are assigned to virtual machines identified by the one or more identifiers; extracting one of the one or more identifiers from an input-output operation received at the storage node; identifying, based on the extracted identifier, the service level that is assigned to the virtual machine that initiated the input-output operation; and controlling storage resources allocated for one or more additional input-output operations from one or more of the virtual machines based at least in part on the identified service level.

Illustrative embodiments can provide significant advantages relative to conventional resource allocation techniques. For example, challenges associated with assigning and enforcing service levels for VMs using different datastores are overcome in one or more embodiments using a management model that works across multiple datastores, host clusters, virtual control stations, and/or operating systems (OSs), and that enables administrators with limited access to a virtual control station to control their respective storage arrays.

These and other illustrative embodiments described herein include, without limitation, methods, apparatus, systems, and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
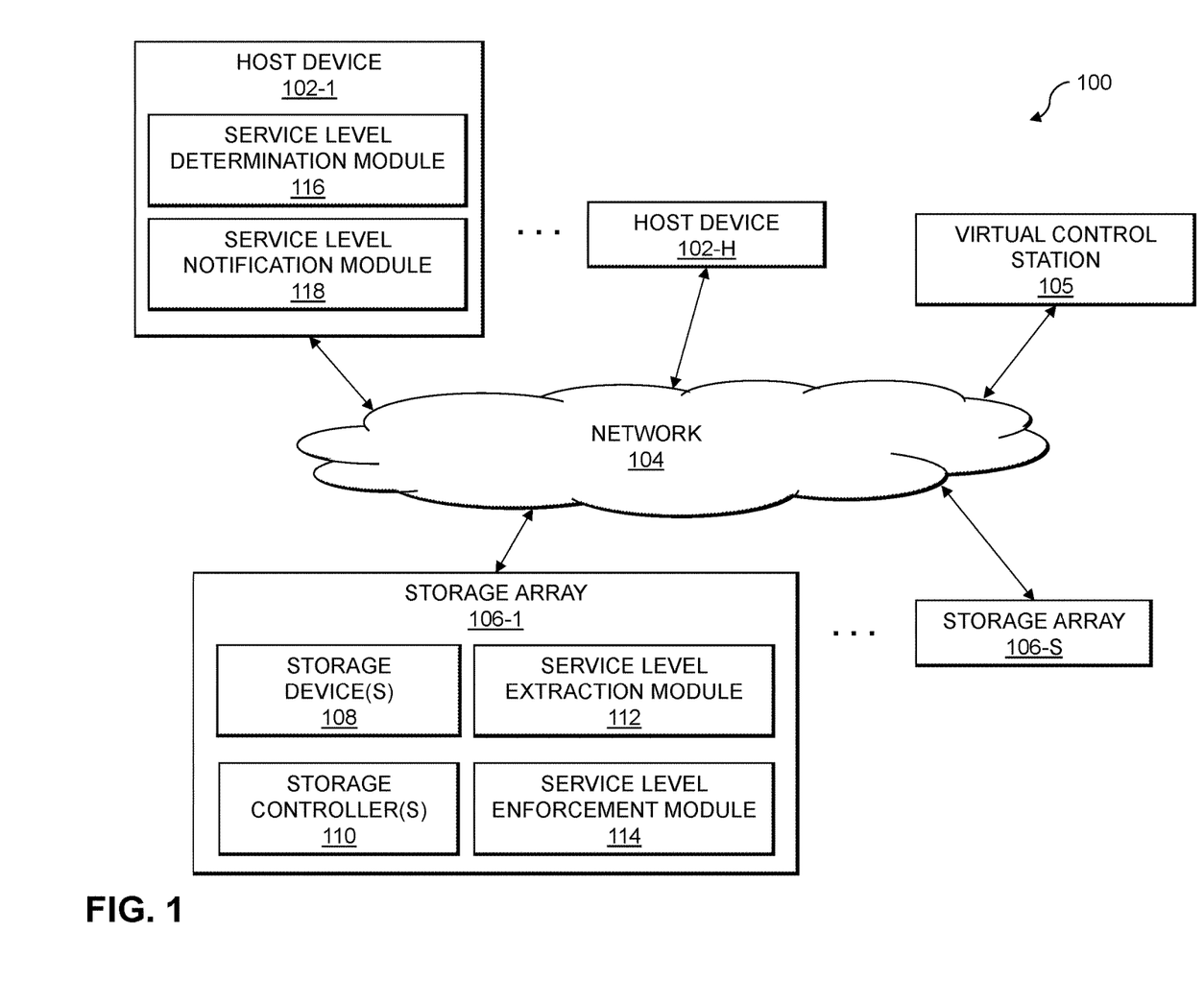
FIG. 1 is a block diagram of an information processing system configured for implementing host-controlled service levels in an illustrative embodiment.

FIG. 1 is a block diagram of an information processing system 100 configured for implementing host-controlled service levels in an illustrative embodiment. The information processing system 100 comprises one or more host devices 102-1, . . . 102-H (collectively, host devices 102) that communicate over a network 104 with a virtual control station 105. The virtual control station 105 may implement software (e.g., VMware vCenter® server software) for managing VMs associated with one or more users (e.g., of the host devices 102).

One or more storage arrays 106-1, . . . 106-S (collectively, storage arrays 106) are also coupled to the network 104, and provide the underlying physical storage for datastores used by the VMs associated with the host devices 102. The storage arrays 106 may represent respective storage nodes of a storage cluster that hosts datastores for the VMs. The network 104, in some embodiments, may comprise a storage area network (SAN).

The storage array 106-1, as shown in FIG. 1, comprises a plurality of storage devices 108 each storing data utilized by one or more applications running on the host devices 102 (e.g., where such applications may include one or more applications running in VMs, including potentially the VMs themselves). The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 and the virtual control station 105 illustratively comprise respective computers, servers or other types of processing devices capable of communicating with the storage arrays 106 via the network 104. For example, the host devices 102 may implement respective VMs of a compute services platform or other type of processing platform. The host devices 102 in such an arrangement illustratively provide compute services such as execution of one or more applications on behalf of each of one or more users (e.g., associated with respective ones of the host devices 102).

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102 (such as for VMs utilized by the users of the host devices 102). These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

In the FIG. 1 embodiment, the storage array 106-1 also includes a service level extraction module 112 and a service level enforcement module 114. Generally, the service level extraction module 112 obtains one or more IO operations, for example, from host devices 102. For a given IO operation, the service level extraction module 112 extracts an identifier corresponding to the VM that initiated the IO operation. The service level extraction module 112 uses the identifier to look up a service level of the VM. The service level enforcement module 114 enforces the service levels of VMs that are extracted by the service level extraction module 112, as described in more detail elsewhere herein. In some embodiments, the modules 112 and 114 can be implemented within a driver of the storage array 106-1 (e.g., a storage data server (SDS) driver). In one or more embodiments, the other storage arrays 106 may be implemented in a similar manner as described above for storage array 106-1.

In this context and elsewhere herein, the term "service level" (also referred to herein as a service level objective (SLO)) is intended to be broadly construed, so as to encompass, for example, a specification of one or more performance objectives. For example, performance objectives may include any of a variety or types of performance objectives corresponding to IO workloads, such as, average response time, average response time for reads or writes specifically, a read cache hit rate threshold, a workload volume threshold, a workload volume density threshold, other performance objectives, performance objectives corresponding to one of the foregoing, or any suitable combination of the foregoing. A storage system may define SLOs that then may be associated with (e.g., assigned to) one or more storage devices or groups of storage devices defined on the storage system, where each storage group may be associated with one or more applications running on host devices 102.

The host device 102-1 in the FIG. 1 embodiment also includes a service level determination module 116 and a service level notification module 118. The service level determination module 116 generally determines service levels assigned to respective VMs that are implemented on the host device 102-1. For example, an administrator may assign service levels to VMs via the virtual control station 105, and the service level determination module 116 can obtain the service levels from the virtual control station 105. The service level notification module 118 notifies one or more of the storage arrays 106 of the service levels assigned to the VMs, as described in more detail elsewhere herein. For a given IO operation, the service level notification module 118 can also insert an identifier of the VM that initiated the IO operation. In some embodiments, the modules 116 and 118 can be implemented within a driver of the host device 102-1 (e.g., a storage data client (SDC) driver). In one or more embodiments, the other host device 102 may be implemented in a similar manner as described above for host device 102-1.

At least portions of the functionality of the modules 112, 114, 116, and 118 may be implemented at least in part in the form of software that is stored in memory and executed by a processor.

The virtual control station 105, as noted above, includes software for managing VMs associated with one or more users (e.g., of the host devices 102). Examples of processing platforms that may be used to implement host devices 102, storage arrays 106, and virtual control station 105 in illustrative embodiments will be described in more detail below in conjunction with FIGS. 5 and 6.

Although shown as external to the host devices 102 and storage arrays 106 in the FIG. 1 embodiment, it should be appreciated that the virtual control station 105 in other embodiments may be implemented at least in part internal to one or more of the host devices 102 and/or one or more of the storage arrays 106 (e.g., such as on the storage controllers 110 of storage array 106-1). For example, one or more of the host devices 102 and/or storage arrays 106 may provide at least a portion of virtualization infrastructure for supporting VMs and datastores storing user data for the VMs.

The system 100, in some examples, includes a metadata manager (not explicitly shown in FIG. 1). The metadata manager can perform various system-related functions (such as migration and rebuilds). The metadata manager may be implemented, for example, on a same or different computing platform as virtual control station 105 and/or one or more of host devices 102.

The host devices 102, storage arrays 106, and the virtual control station 105 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

The host devices 102, the storage arrays 106 and the virtual control station 105 may be implemented on respective distinct processing platforms, although numerous other arrangements are possible. For example, in some embodiments at least portions of one or more of the host devices 102, the storage arrays 106 and the virtual control station 105 are implemented on the same processing platform. The virtual control station 105, one or more of the storage arrays 106, or combinations thereof, can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1, in some embodiments, comprises a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel® Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 and other portions of the system 100, such as the virtual control station 105, may in some embodiments be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more VMs or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 and the virtual control station 105 may be implemented at least in part in the first geographic location, the second geographic location, and one or more other geographic locations. Thus, it is possible in some implementations of the system 100 for different ones of the host devices 102, the storage arrays 106 and the virtual control station 105 to reside in different data centers.

Numerous other distributed implementations of the host devices 102, the storage arrays 106 and the virtual control station 105 are possible. Accordingly, the host devices 102, the storage arrays 106 and the virtual control station 105 can also be implemented in a distributed manner across multiple data centers.

Additional examples of processing platforms utilized to implement portions of the system 100 in illustrative embodiments will be described in more detail below in conjunction with FIGS. 5 and 6.

It is to be understood that the particular set of elements shown in FIG. 1 is presented by way of illustrative example only, and in other embodiments additional or alternative elements may be used. Thus, another embodiment may include additional or alternative systems, devices and other network entities, as well as different arrangements of modules and other components.

For example, the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

It is to be appreciated that these and other features of illustrative embodiments are presented by way of example only, and should not be construed as limiting in any way.

An exemplary process utilizing modules 112 and 114 will be described in more detail with reference to the flow diagram of FIG. 3A, and an exemplary process utilizing modules 116 and 118 will be described in more detail with reference to the flow diagram of FIG. 3B.

Figure 2:
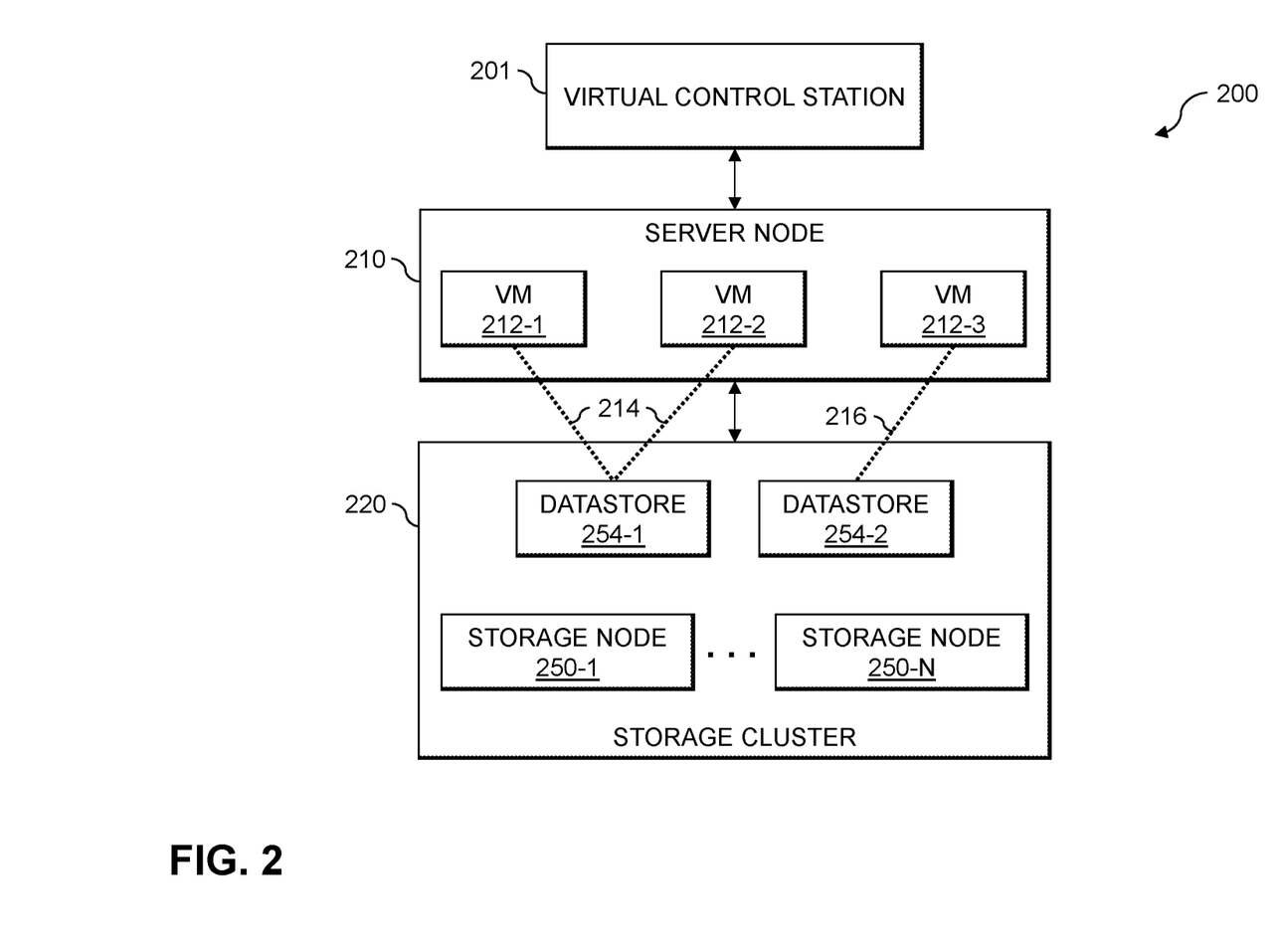
FIG. 2 illustrates an example of a virtualization environment in an illustrative embodiment.

Referring now to FIG. 2, this figure illustrates a virtualization environment 200 in an illustrative embodiment. The virtualization environment 200 includes a virtual control station 201, a server node 210, and a storage cluster 220.

Generally, the virtual control station 201 provides functionality for managing the server node 210 and its respective VMs 212-1, 212-2, and 212-3. As a non-limiting example, the virtual control station 201 and the server node 210 can implement a VMware vCenter® server instance and a VMware ESXi™ host, respectively.

The storage cluster 220 includes a set of storage nodes 250-1, . . . 250-N (collectively, storage nodes 250) and datastores 254-1 and 254-2 (collectively datastores 254). The storage nodes 250 enable data services on the datastores 254. The datastores 254 can comprise one or more types of datastores (including, for example, virtual volumes datastores, virtual SAN datastores, and NFS datastores). In some embodiments, the datastores 254 may be created inside one or more storage containers (not explicitly shown in FIG. 2) each of which can provide a pool of storage capacity that can be used by VMs 212-1, 212-2, and 212-3, for example.

In this example, VM 212-1 and VM 212-2 are configured to use datastore 254-1 as indicated by dashed lines 214, and VM 212-3 is configured to use datastore 254-2 as indicated by dashed line 216.

The FIG. 2 embodiment shows a single server node 210 for clarity, however, it is to be appreciated that the virtualization environment 200 may include a different number of server nodes in other embodiments. It is also to be appreciated that a different numbers of VMs 212 and/or a different number of datastores 254 may also be employed in other embodiments.

Existing techniques for managing storage resource allocation are generally based on VM service levels, which are set and enforced by a virtualizer (e.g., Storage I/O Control (SIOC)) implemented at the virtual control station 201. Typically, the storage resource allocation is controlled separately for each datastore. Such techniques are not applicable to VM 212-2 and VM 212-3 in FIG. 2, for example, because each use a different datastore (datastore 254-1 and datastore 254-2, respectively). Accordingly, existing techniques do not allow a user to assign a higher priority to VM 212-2 than VM 212-3.

For the case of an external service provider with response time floors, the lowest response time needs to be bounded by the service level, and this cannot be done using existing techniques (such as SIOC). Additionally, in a consolidation storage environment (e.g., PowerMax™ or PowerFlex™), there is a need for a management model that works across multiple datastores, host clusters (e.g., ESX clusters), virtual control stations (e.g., VMware vCenter® servers), and/or OSs.

At least some embodiments described herein provide host-controlled service levels that can be configured for each VM and/or container. In one or more embodiments, a user can set a service level for a specific VM and the service level can be enforced by a driver on a production host and a driver on the storage node. Additionally, such embodiments can be applied to both raw device mappings (RDMs) and datastores.

Figure 3A:
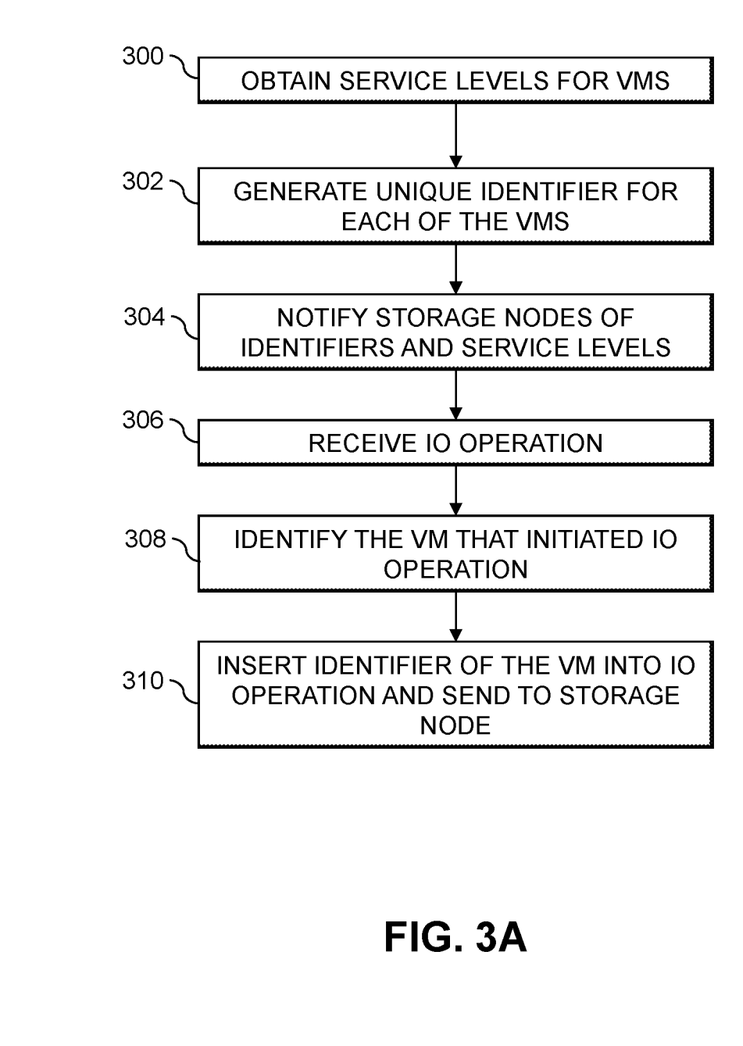
FIGS. 3A and 3B are flow diagrams of exemplary processes for implementing host-controlled service levels in accordance with illustrative embodiments.
Figure 3B:
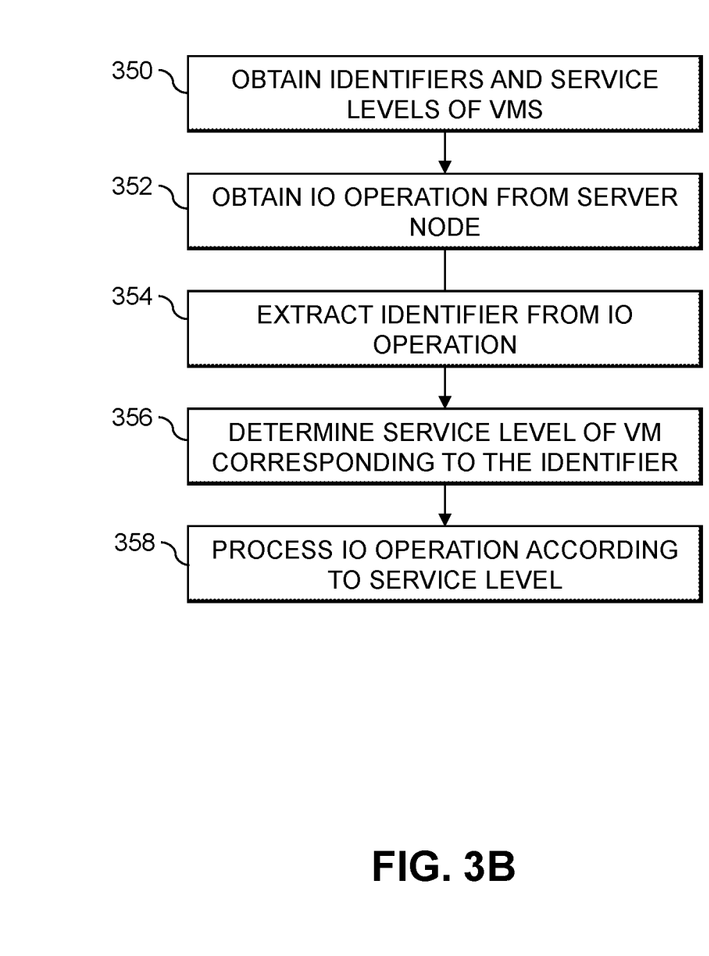

FIGS. 3A and 3B are flow diagrams of exemplary processes for implementing host-controlled service levels in accordance with illustrative embodiments.

The process in FIG. 3A includes steps 300 through 310. These steps are assumed to be performed by a server node (e.g., host device 102-1 utilizing at least in part its service level determination module 116 and service level notification module 118).

Step 300 includes obtaining one or more service levels for one or more VMs. For example, the service levels can be defined by a user in a virtual control station (e.g., a VMware vCenter® server instance). Alternatively, or additionally, the service levels can be defined in a graphical user interface (GUI) associated with a storage system (e.g., Metadata Manager (MDM)), which interfaces with the virtualizer control station, if needed. If a service level is not defined for a particular VM, then a default service level can be assigned. Step 300 may include, for example, reading the service levels from the virtualizer control station (or the MDM) into the server node's driver that is responsible for enforcing the service levels.

Step 302 includes generating a unique identifier for each of the VMs.

Step 304 includes notifying each storage node, that the server node communicates with, of the identifiers and the corresponding service levels of the VMs. This allows, for example, a given storage node to look up the service levels of the VMs based on the identifiers. In at least one embodiment, step 304 can be performed each time the server node boots or in response to a migration event associated with the storage node (e.g., resulting from actions from VMware vSphere® vMotion®).

Step 306 includes receiving an IO operation from one of the VMs, and step 308 includes identifying the VM that initiated the IO operation. Step 310 includes inserting the identifier of the identified VM into the IO operation and sending the IO operation to the storage node.

The process in FIG. 3B includes steps 350 through 358. These steps are assumed to be performed by a storage node (e.g., storage array 106-1 utilizing at least in part its service level extraction module 112 and service level enforcement module 114).

Step 350 includes obtaining one or more identifiers and one or more service levels of one or more VMs from a server node. For example, the identifiers and services levels can be obtained as a result of step 304 of FIG. 3A.

Step 352 includes obtaining an IO operation from a given server node, and step 354 includes extracting an identifier from the IO operation, where the identifier corresponds to the VM that initiated the IO operation.

Step 356 includes determining the service level of the VM corresponding to the identifier based on the information obtained at step 350.

Step 358 includes processing the IO operation according to the service level. For example, step 358 may include throttling down the performance of one or more IO operations of the VM so that a target performance metric of another VM having a higher priority service level can be met. As another example, in response to identifying that a VM has a lower service level and that there is a need to allocate additional resources to one or more VMs having higher service levels, the storage node may send a request to the server node requesting to reduce the resources allocated to the VM having the lower service level. This can help avoid IO operations originating from the VM having the lower service level from being sent to the storage node.

Figure 4:
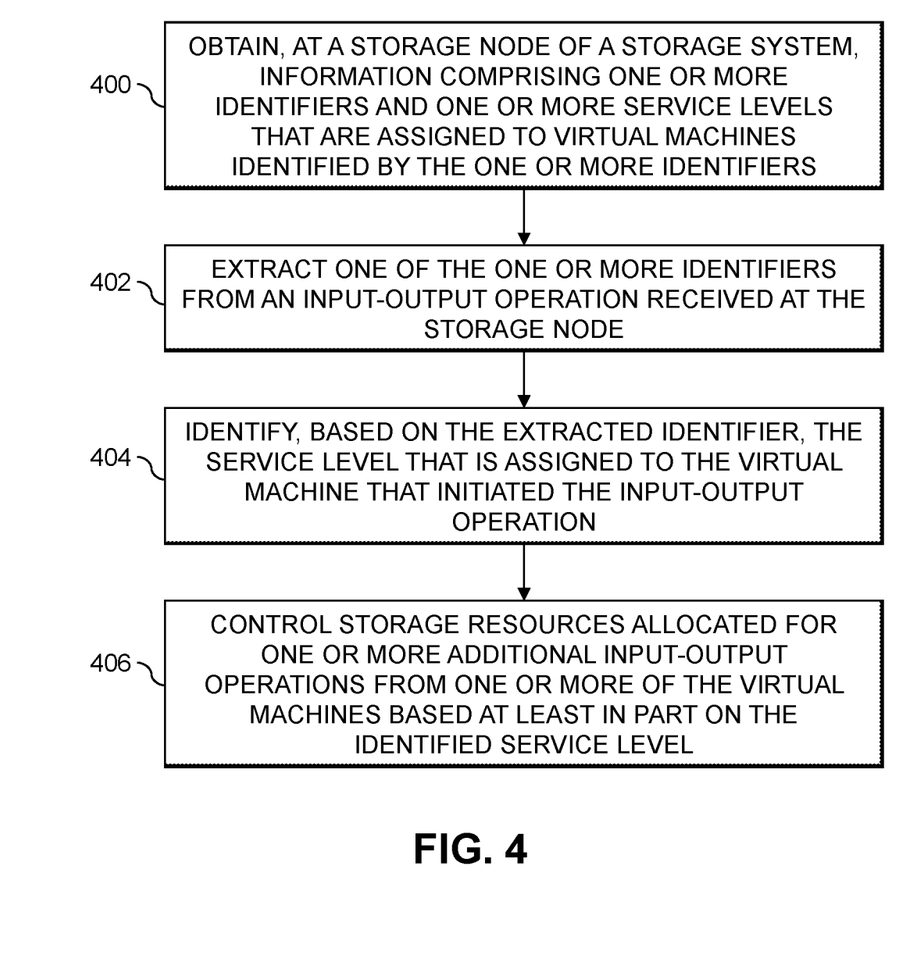
FIG. 4 is a flow diagram of a host-controlled service level process in an illustrative embodiment.

FIG. 4 shows an example of a process for implementing host-controlled service levels in illustrative embodiments. It is to be understood that this particular process is only an example, and additional or alternative processes can be carried out in other embodiments.

In this embodiment, the process includes steps 400 through 406. These steps are assumed to be performed, at least in part by, the host device 102-1 utilizing its modules 116 and 118.

Step 400 includes obtaining, at a storage node of a storage system, information comprising one or more identifiers and one or more service levels that are assigned to virtual machines identified by the one or more identifiers. Step 402 includes extracting one of the one or more identifiers from an input-output operation received at the storage node. Step 404 includes identifying, based on the extracted identifier, the service level that is assigned to the virtual machine that initiated the input-output operation. Step 406 includes controlling storage resources allocated for one or more additional input-output operations from one or more of the virtual machines based at least in part on the identified service level.

Each of the one or more service levels may specify one or more performance objectives. The one or more performance objectives may correspond to at least one of: an average response time for read operations, an average response time for write operations, a read cache hit rate threshold, a workload volume threshold, and a workload volume density threshold. The controlling may be performed in response to a latency metric satisfying a threshold value. The controlling may include reducing the storage resources allocated for at least one of the additional input-output operations that is from the virtual machine that initiated the input-output operation. The controlling may include sending a request to a server node to reduce the storage resources allocated to the virtual machine that initiated the input-output operation, wherein the server node implements the virtual machine that initiated the input-output operation. The one or more identifiers may be generated at a server node that implements the virtual machines. At least a first one of the virtual machines may use a first datastore associated with the storage node, and at least a second one of the virtual machines may use a second, different datastore associated the storage node. At least a portion of the information may be sent from a server node that implements one or more of the virtual machines, and the server node may update the portion of the information in response to a reboot operation.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional storage resource allocation approaches. For example, some embodiments provide a management model that works across multiple datastores, host clusters, virtual control stations, and/or OSs. Also, some embodiments enable users (e.g., storage administrators) with limited access to a virtual control station to control their respective storage arrays.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for implementing host-controlled service levels will now be described in greater detail with reference to FIGS. 5 and 6. Although described in the context of system 100, these platforms may also be used to implement at least portions of other information processing systems in other embodiments.

Figure 5:
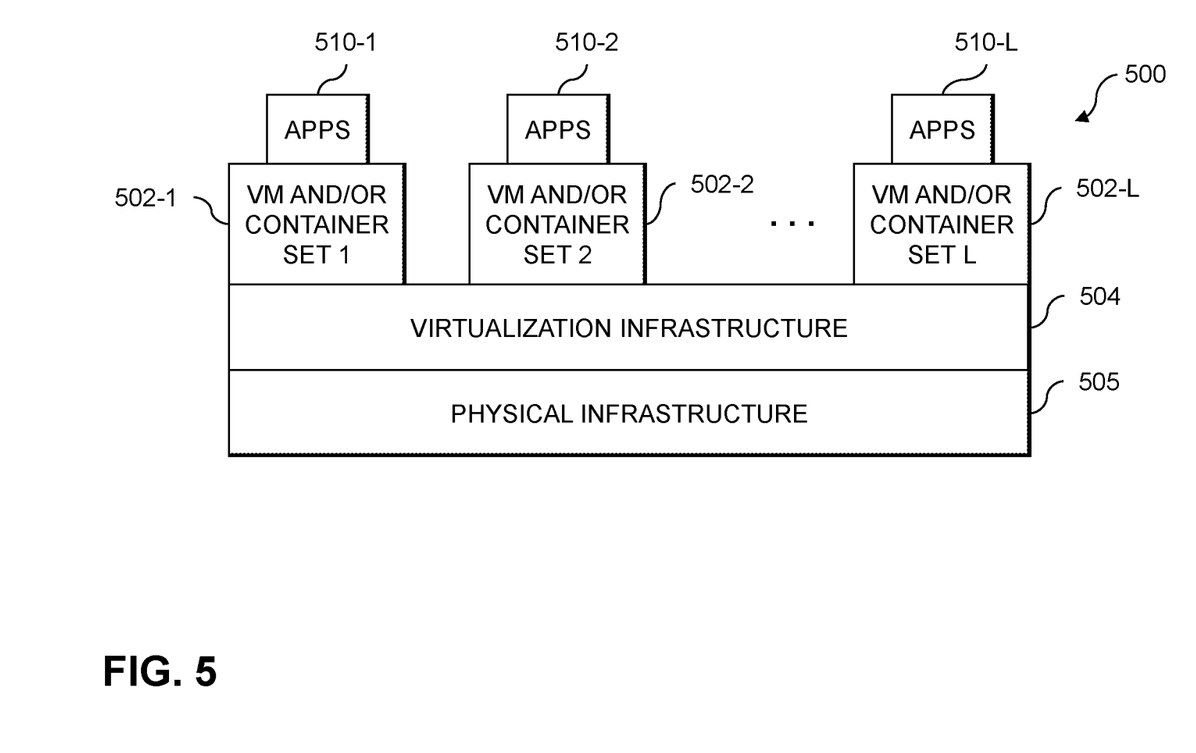
FIGS. 5 and 6 show examples of processing platforms that may be utilized to implement at least a portion of an information processing system in illustrative embodiments.
Figure 6:
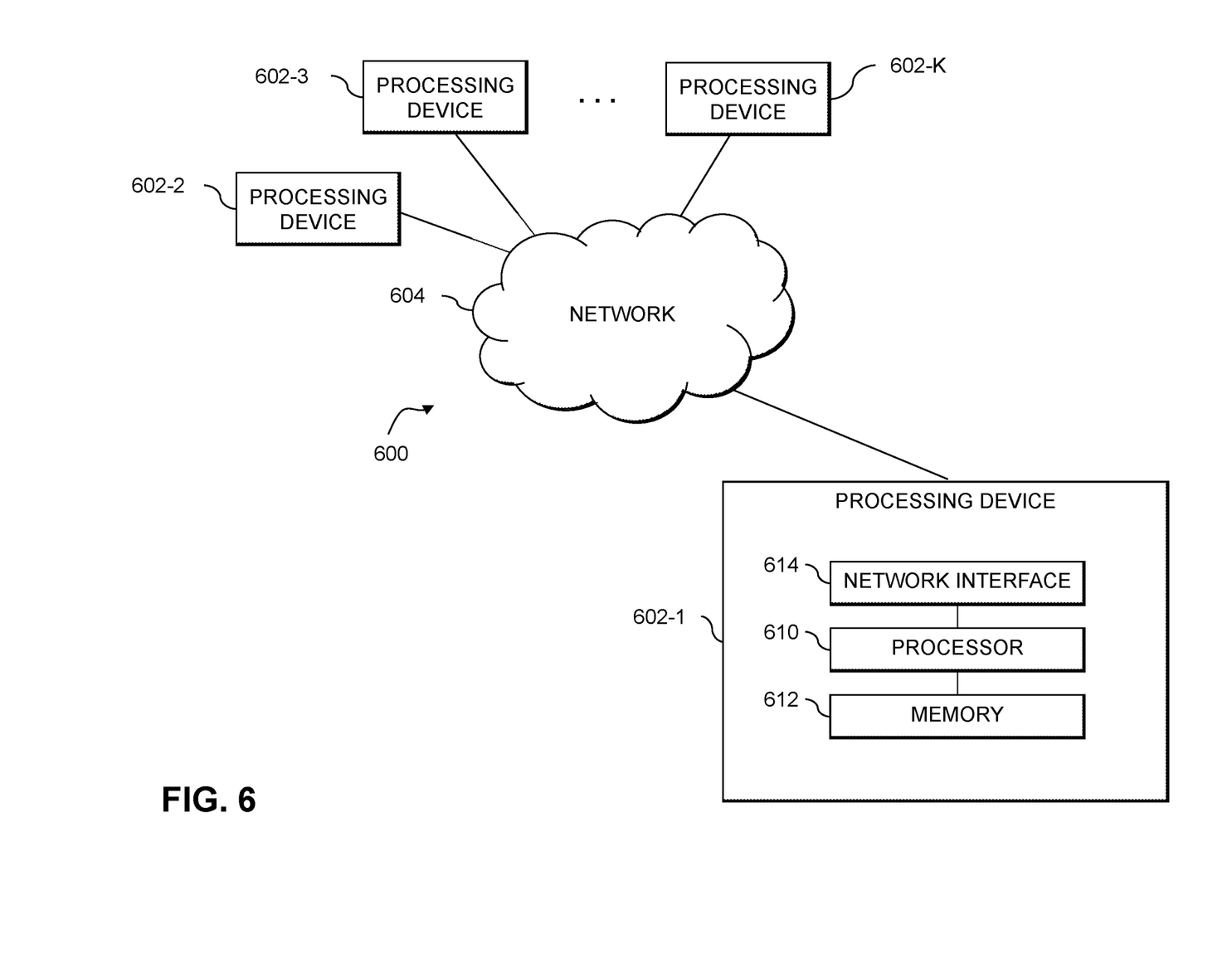

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple VMs and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux OS or other type of OS.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the OS.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU), or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory, or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for implementing host-controlled service levels as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, virtualization infrastructures, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining, by a storage node of a storage system, information provided by one or more server nodes, wherein the information comprises one or more identifiers and one or more service levels that are assigned to virtual machines identified by the one or more identifiers, and wherein the virtual machines are implemented by the one or more server nodes;
    extracting, by the storage node, one of the one or more identifiers from an input-output operation received at the storage node, wherein the input-output operation comprises at least one of: a read request and a write request to the storage node;
    identifying, by the storage node and based on the extracted identifier, the service level that is assigned to a first virtual machine of the virtual machines, wherein the first virtual machine initiated the input-output operation; and
    controlling, by the storage node, storage resources of the storage node allocated for the first virtual machine for processing one or more additional input-output operations from at least one of: (i) the first virtual machine and (ii) at least one second virtual machine of the virtual machines that utilizes the storage resources of the storage node, wherein the controlling comprises causing an adjustment to the storage resources based at least in part on the identified service level and at least one other service level identified for the at least one second virtual machine, wherein the first virtual machine uses a first datastore associated with the storage node, and wherein the at least one second virtual machine uses a second datastore associated with the storage node that is different than the first datastore;
    wherein the method is performed by at least one processing device comprising a processor coupled to a memory.

2. The computer-implemented method of claim 1, wherein each of the one or more service levels specifies one or more performance objectives.

3. The computer-implemented method of claim 2, wherein the one or more performance objectives correspond to at least one of: an average response time for read operations, an average response time for write operations, a read cache hit rate threshold, a workload volume threshold, and a workload volume density threshold.

4. The computer-implemented method of claim 1, wherein the controlling is performed in response to a latency metric satisfying a threshold value.

5. The computer-implemented method of claim 1, wherein the causing the adjustment comprises reducing the storage resources allocated for the first virtual machine for processing at least one of the additional input-output operations.

6. The computer-implemented method of claim 1, wherein the causing the adjustment comprises sending a request to the server node that implements the first virtual machine to reduce the storage resources allocated to the first virtual machine.

7. The computer-implemented method of claim 1, wherein each of the one or more identifiers are generated by a respective one of the one or more server nodes that implements the corresponding virtual machine.

8. The computer-implemented method of claim 1, wherein at least a portion of the information is sent from a first server node of the one or more server nodes, and wherein the first server node updates the portion of the information in response to a reboot operation.

9. A non-transitory processor-readable storage medium having stored therein program code of one or more software programs, wherein the program code when executed by at least one processing device causes the at least one processing device:
    to obtain, by a storage node of a storage system, information provided by one or more server nodes, wherein the information comprises one or more identifiers and one or more service levels that are assigned to virtual machines identified by the one or more identifiers, and wherein the virtual machines are implemented by the one or more server nodes;
    to extract, by the storage node, one of the one or more identifiers from an input-output operation received at the storage node, wherein the input-output operation comprises at least one of: a read request and a write request to the storage node;
    to identify, by the storage node and based on the extracted identifier, the service level that is assigned to a first virtual machine of the virtual machines, wherein the first virtual machine initiated the input-output operation; and
    to control, by the storage node, storage resources of the storage node allocated for the first virtual machine for processing one or more additional input-output operations from at least one of: (i) the first virtual machine and (ii) at least one second virtual machine of the virtual machines that utilizes the storage resources of the storage node, wherein the controlling comprises causing an adjustment to the storage resources based at least in part on the identified service level and at least one other service level identified for the at least one second virtual machine, wherein the first virtual machine uses a first datastore associated with the storage node, and wherein the at least one second virtual machine uses a second datastore associated with the storage node that is different than the first datastore.

10. The non-transitory processor-readable storage medium of claim 9, wherein each of the one or more service levels specifies one or more performance objectives.

11. The non-transitory processor-readable storage medium of claim 10, wherein the one or more performance objectives correspond to at least one of: an average response time for read operations, an average response time for write operations, a read cache hit rate threshold, a workload volume threshold, and a workload volume density threshold.

12. The non-transitory processor-readable storage medium of claim 9, wherein the controlling is performed in response to a latency metric satisfying a threshold value.

13. The non-transitory processor-readable storage medium of claim 9, wherein the causing the adjustment comprises reducing the storage resources allocated for the first virtual machine for processing at least one of the additional input-output operations.

14. The non-transitory processor-readable storage medium of claim 9, wherein the causing the adjustment comprises sending a request to the server node that implements the first virtual machine to reduce the storage resources allocated to the first virtual machine.

15. An apparatus comprising:
at least one processing device comprising a processor coupled to a memory;
the at least one processing device being configured:
to obtain, by a storage node of a storage system, information provided by one or more server nodes, wherein the information comprises one or more identifiers and one or more service levels that are assigned to virtual machines identified by the one or more identifiers, and wherein the virtual machines are implemented by the one or more server nodes;
to extract, by the storage node, one of the one or more identifiers from an input-output operation received at the storage node, wherein the input-output operation comprises at least one of: a read request and a write request to the storage node;
to identify, by the storage node and based on the extracted identifier, the service level that is assigned to a first virtual machine of the virtual machines, wherein the first virtual machine initiated the input-output operation; and
to control, by the storage node, storage resources of the storage node allocated for the first virtual machine for processing one or more additional input-output operations from at least one of: (i) the first virtual machine and (ii) at least one second virtual machine of the virtual machines that utilizes the storage resources of the storage node, wherein the controlling comprises causing an adjustment to the storage resources based at least in part on the identified service level and at least one other service level identified for the at least one second virtual machine, wherein the first virtual machine uses a first datastore associated with the storage node, and wherein the at least one second virtual machine uses a second datastore associated with the storage node that is different than the first datastore.

16. The apparatus of claim 15, wherein each of the one or more service levels specifies one or more performance objectives.

17. The apparatus of claim 16, wherein the one or more performance objectives correspond to at least one of: an average response time for read operations, an average response time for write operations, a read cache hit rate threshold, a workload volume threshold, and a workload volume density threshold.

18. The apparatus of claim 15, wherein the controlling is performed in response to a latency metric satisfying a threshold value.

19. The apparatus of claim 15, wherein the causing the adjustment comprises reducing the storage resources allocated for the first virtual machine for processing at least one of the additional input-output operations.

20. The apparatus of claim 15, wherein the causing the adjustment comprises sending a request to the server node that implements the first virtual machine to reduce the storage resources allocated to the first virtual machine.

\* \* \* \* \*